Sept. 12, 1950
H. L. HARDIN
2,522,267
HOIST FOR MOTOR VEHICLE PARTS
Filed Aug. 4, 1948
4 Sheets-Sheet 1
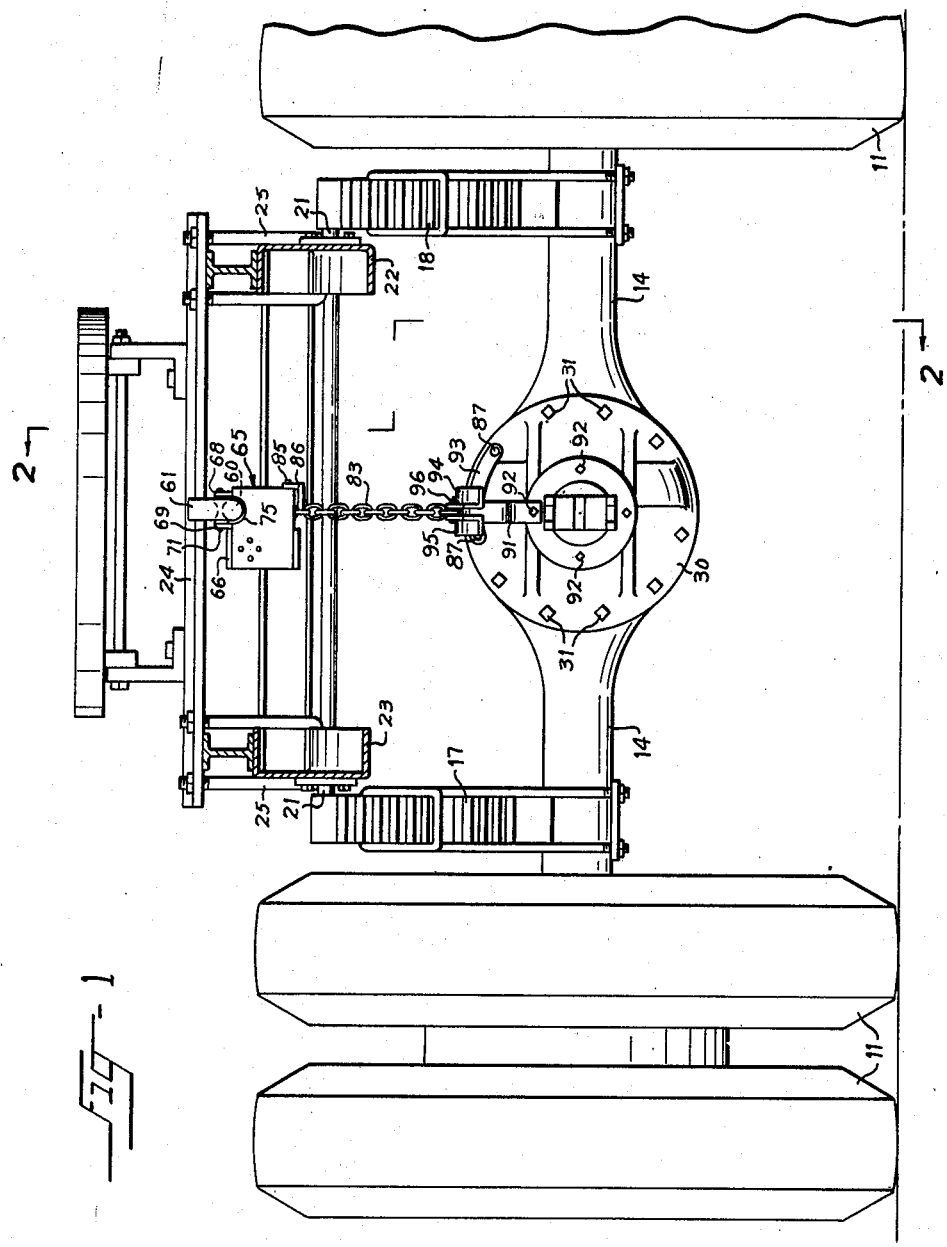
HARRY L. HARDIN,
Inventor.
By Paul S. Eaton
Attorney

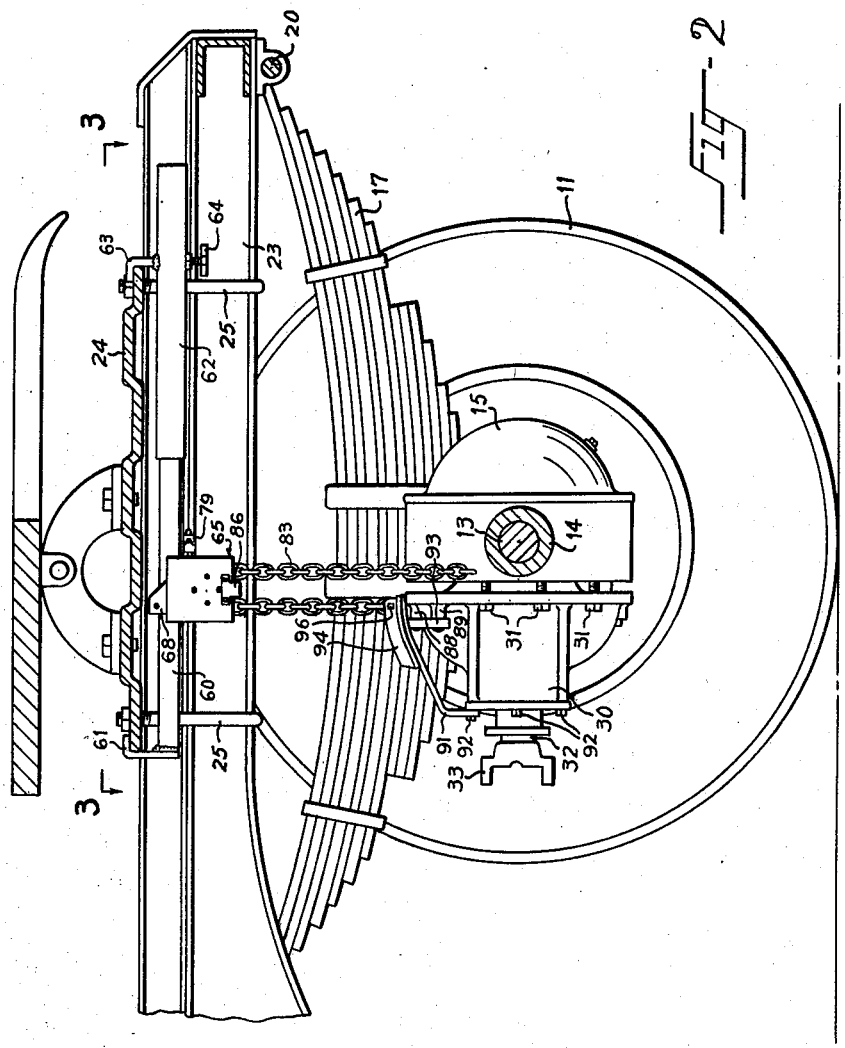

Sept. 12, 1950     H. L. HARDIN     2,522,267
HOIST FOR MOTOR VEHICLE PARTS
Filed Aug. 4, 1948     4 Sheets-Sheet 3
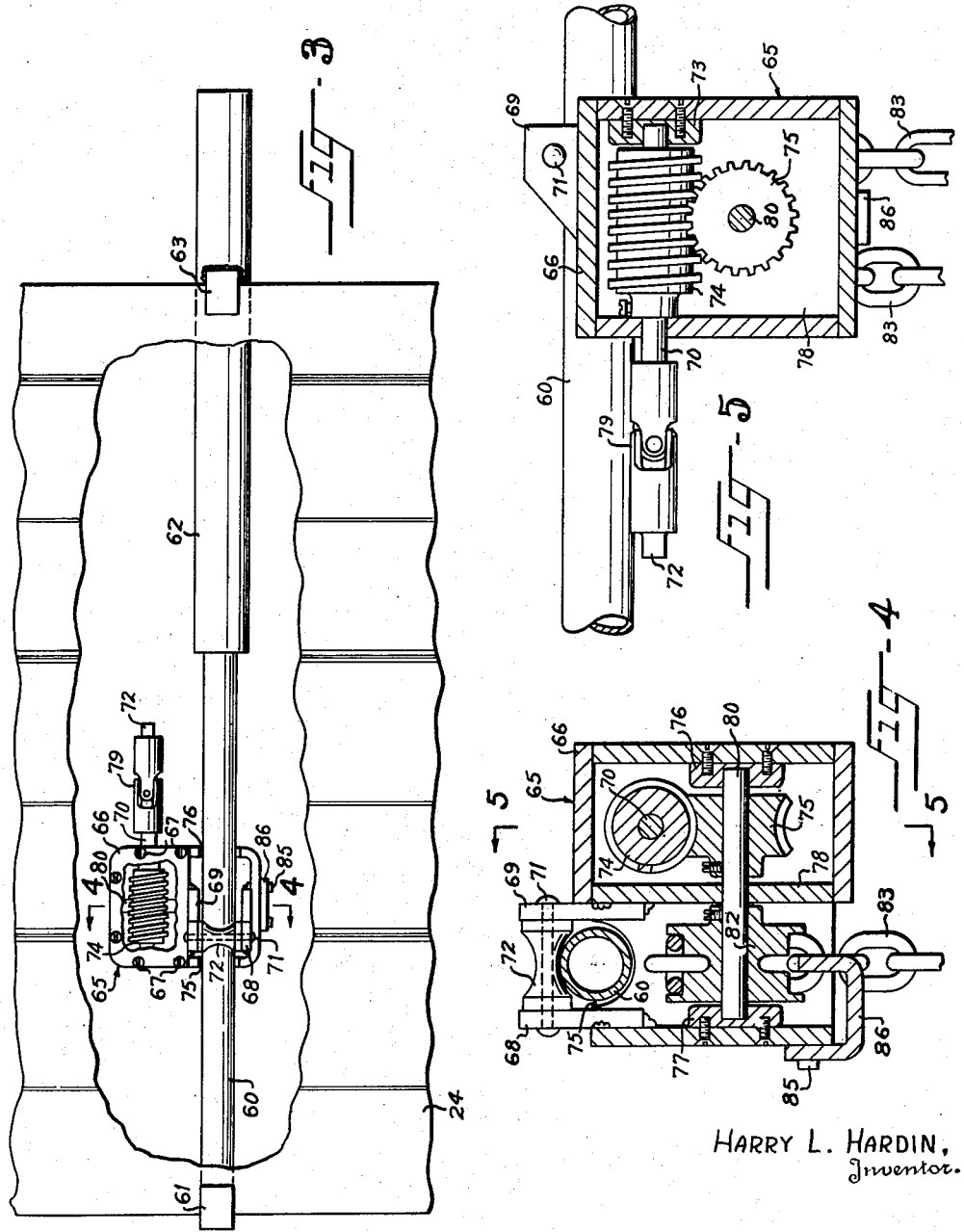
HARRY L. HARDIN,
Inventor.
By Paul K. Eaton
Attorney Sept. 12, 1950 H. L. HARDIN 2,522,267
HOIST FOR MOTOR VEHICLE PARTS
Filed Aug. 4, 1948 4 Sheets-Sheet 4
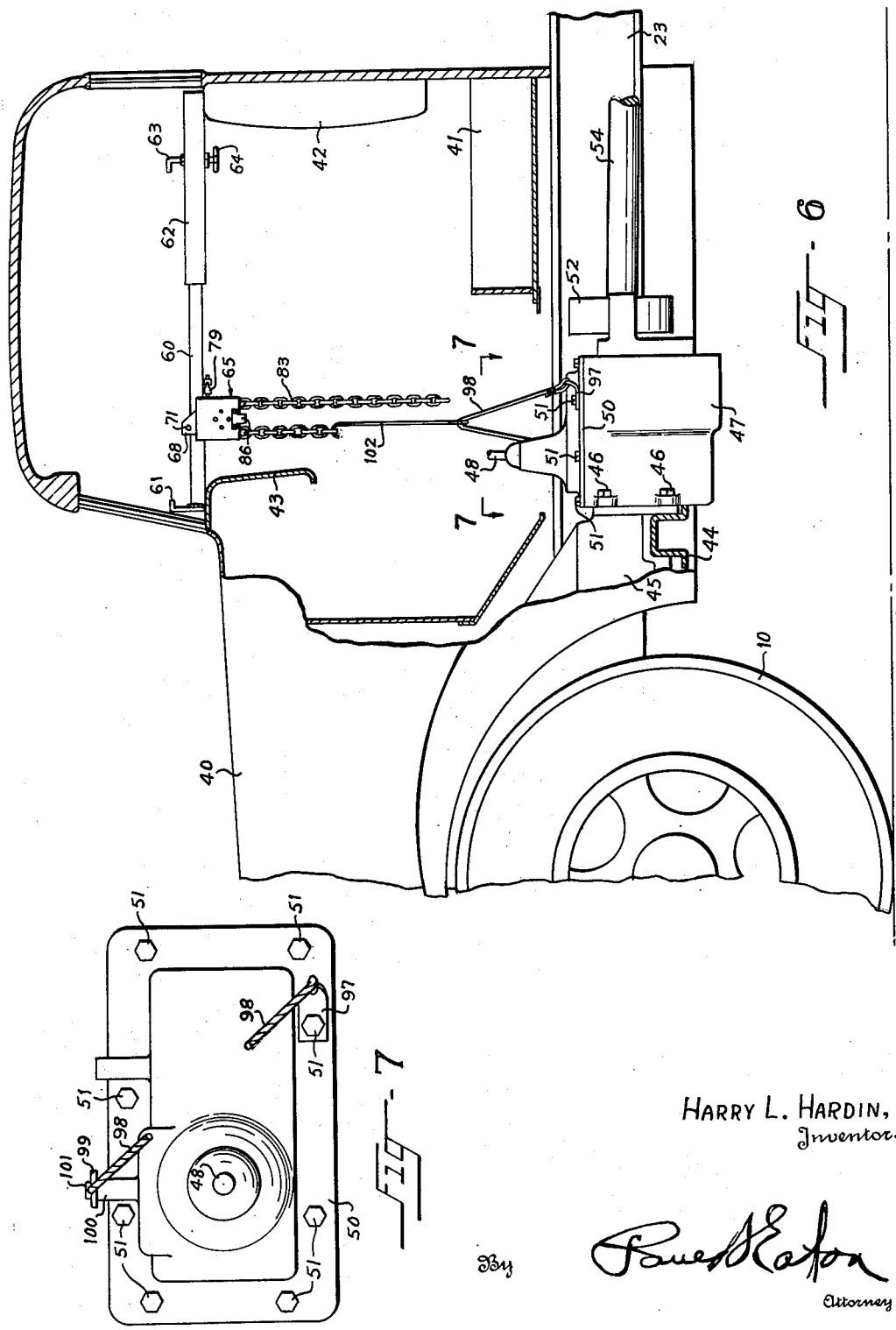
Harry L. Hardin,
Inventor.

Patented Sept. 12, 1950

2,522,267

UNITED STATES PATENT OFFICE 2,522,267

HOIST FOR MOTOR VEHICLE PARTS

Harry L. Hardin, Charlotte, N. C.

Application August 4, 1948, Serial No. 42,499

1 Claim. (Cl. 212—134)

This invention relates to a hoist adapted to be supported by portions of the chassis or framework of a motor vehicle for supporting and moving heavy assemblies of the motor vehicle from out of position and into position when it is necessary to replace the same.

It is a well-known fact that in large motor vehicles, such as automotive tractors, occasionally there is a break down on the road, requiring that a mechanic go to the spot and make repairs such as by inserting a new transmission or a new differential mechanism. These assemblies weigh several hundred pounds and it is quite a proposition to remove a transmission or a differential assembly from its operative position and then to remove it from beneath the tractor and likewise it is a very laborious proposition, due to cramped quarters, to raise and install a new transmission or differential.

It is an object of this invention to provide a suitable trackway which is adapted to be detachably secured to parts of the framework of the motor vehicle such as a tractor and having a hoist adapted to move along the trackway with means for securing one end of the chain which forms a part of the hoist to the differential or the transmission assembly as the case may be, so when the bolts holding the differential in position or the bolts holding the transmission in position have been removed, the assembly will be supported by the chain hoist and then the chain hoist can be moved along its trackway to entirely remove the assembly from position as in the case of a differential, whereas in the case of a transmission, it can be moved longitudinally of the vehicle, if desired, to avoid certain parts and can then be lowered onto a suitable dollie resting on the ground or pavement beneath the vehicle and it can then be removed from beneath the vehicle, and by the reverse operation, a new differential or transmission can be installed.

Some of the objects of the invention having been stated, other objects will appear as the description proceeds, when taken in connection with the accompanying drawings, in which Figure 1 is an elevation with parts in section looking from the left-hand side of Figure 2;

Figure 2 is a vertical sectional view taken along the line 2—2 in Figure 1;

Figure 3 is a sectional plan view with parts broken away and taken along the line 3—3 in Figure 2;

Figure 4 is a vertical sectional view taken along the line 4—4 in Figure 3;

Figure 5 is a vertical sectional view taken along the line 5—5 in Figure 4;

Figure 6 is an elevation of a cab portion of an automotive tractor with parts broken away and showing my invention in installed position;

Figure 7 is a top plan view looking along the line 7—7 in Figure 6.

Referring more specifically to the drawings, the numeral 10 indicates the front wheels of a tractor while the numeral 11 indicates the rear wheels, the rear wheels being mounted on suitable axles 13 disposed with axle housings 14, the axle housings having integral therewith a differential housing 15. The tractor is also equipped with suitable conventional leaf springs 17 and 18, which have their rear ends secured to a transverse bolt 20 and their front ends to stub bolts 21, which are mounted on side chassis frame members 22 and 23. These side frame members 22 and 23 usually support a fifth wheel plate 24 which is secured to the side frame members 22 and 23 by any suitable means such as U-bolts 25.

The differential housing 15 houses a differential mechanism 30 which is secured in position in the housing by any suitable means such as screws 31 and shown in Figure 2 as being partially removed. Projecting from the front side of this differential housing is a differential drive shaft 32 which has a connection 33 for connecting it to the rear end of the drive shaft extending from the universal joint associated with the transmission mechanism to be presently described.

The automotive tractor is also equipped with a suitable engine, not shown, disposed under a hood 40 and is provided with a cab having a seat support frame 41 and back 42 and an instrument board 43. The engine is connected at its rear end to a clutch housing 45 which is supported in any suitable manner such as by cross struts 44. The engine crank shaft, not shown, extends into the clutch housing, and to the rear end of the clutch housing by means of bolts 46 is secured a transmission housing 47 having a gear shift lever 48 extending from the upper side thereof and provided with a cap 50 secured in position by means of screws 51. A drive shaft, not shown, extends from the rear end of the transmission housing and has a conventional brake drum 52 secured thereon which houses a suitable universal joint, not shown, to which the front end of the drive shaft 54 is secured in a conventional manner.

Now, it so happens that when it is necessary to remove a differential assembly from the housing 15, as heretofore pointed out, due to the great weight of the assembly, it is quite a laborious proposition for, say two mechanics, to get underneath the automotive tractor and loosen the bolts 31 and to remove the differential assembly 30 therefrom. In order to provide means for handling the differential assembly as well as the transmission assembly, I have provided a suitable trackway comprising a tube 60 having a right angle clip 61 welded to its front end and having a tube 62 slidably mounted on the rear end of the tube 60 to which is welded another right angle clip 63. Tube 62 has a set screw 64 threaded therein, which, when driven home, engages tube 60 and holds the tubes 60 and 62 in adjusted position.

Mounted for sliding movement on the shaft 60 is a chain hoist mechanism, broadly indicated at 65. This chain hoist mechanism has a suitable cover 66 secured thereon, by any suitable means such as screws 67, and has a pair of bars 68 and 69 extending out of the open top of the same and having a pin 71 mounted thereon on which is mounted a roller 72 which is adapted to have movement on the shaft or tube 60.

The housing 65 has semi-circular openings 75 and 76 which are loosely penetrated by the tube 60. The housing has rotatably mounted therein a shaft 70 which projects to the exterior of the housing casing and has a universal joint 79 on its exterior end which has a suitable wrench receiving portion 72, which may be a male portion, as shown, or as a female portion as appears in some types of universal joints, and the right-hand end of the shaft 70, in Figure 5, is journaled in a bearing block 73 secured to the interior wall of the housing 65. Inside the housing 65 there is secured on the shaft 70 a worm 74 which is adapted to mesh with a worm gear 75 fixedly mounted on a shaft 80 rotatably mounted in bearing blocks 76 and 77 on the interior walls of the housing 65. The shaft 80 is also rotatably mounted in a division wall 78 forming a part of the housing. The shaft 80 has fixedly secured thereon a pulley 82, the periphery of which is so formed as to receive a suitable link chain 83 and to prevent slippage of the same. Secured to the exterior of the housing 65 by any suitable means such as a screw 85 is a U-shaped clip 86 which extends downwardly, inwardly and upwardly between the two downwardly depending ends of the chain 83 to keep the two ends of the chain separated at all times.

Now, in order to properly handle a differential mechanism, the tubes 60 and 62 will be disposed in the position shown in Figures 2 and 3 and a bracket having a leg 91 will be secured to the front end of the differential as by a screw 92 and an arcuate leg portion 93 integral with the leg portion 91 will be secured to two projections 88 and 89 which project from the front face of the differential mechanism by means of pins 87 being inserted through the portion 93 and extending into bores in the projections 88 and 89. Welded to the top surface of the arcuate leg 91 is a pair of angle members 94 and 95 which have a pin 96 passed therethrough, this pin being removable, and the lower end of the chain 83 will be passed between the uprising portion of the angle brackets 94 and 95 and the pin 96 positioned as shown in the drawings, and then all of the screws 31 can be removed and the differential mechanism can be rolled to the left in Figure 2 completely out of the differential housing at which time the chain hoist can be operated by a suitable wrench to lower the differential mechanism onto a suitable dollie disposed on the ground or it could be deposited onto a canvas or other means for removing it from beneath the tractor.

In the event that a transmission mechanism is desired to be handled, the tube 60 will be placed on top of the instrument board 43 and the tube 62 will be placed on top of the seat back 42 and one of the bolts 51 will be removed from the transmission cover and employed for securing a bracket 97 in position and this bracket has secured thereto one end of a cable 98, and the other end of the cable has a ring or washer 99 thereon which is secured over a shaft 100 to which the brake lever is usually secured and this washer 99 will be secured in position by means of a screw 101. Then a suitable hooked member 102 will be hooked beneath the cable 98 and its other end hooked into a link of chain 83 and then with the screws 46 removed and the universal joint disposed within the brake drum 52 disconnected, the transmission housing can be lowered to the ground or onto a dollie disposed underneath the same.

In installing a new differential mechanism or a new transmission housing, the same procedure as above outlined will be employed except that the operation will be reversed.

In the drawings and specification there has been set forth a preferred embodiment of the invention, and although specific terms are employed, they are used in a generic and descriptive sense only, and not for purposes of limitation, the scope of the invention being defined in the claim.

I claim:

Apparatus for handling heavy assemblies in automotive vehicles, such as transmissions, differentials, and the like, comprising two elongated members telescopically mounted with relation to each other, each member having an uprising clip secured thereto, the clips having their upper ends projecting towards each other and adapted to rest on opposed edges of a suitable support, above the assembly to be removed or installed, a chain hoist mounted for rolling movement along the telescopic member and having a chain depending therefrom, means extending from the chain hoist and having a wrench receiving portion whereby a wrench can be applied to the chain hoist to raise or lower the lower end of the chain depending from the chain hoist, means for attaching the lower end of the chain hoist to the assembly to be removed or installed and whereby when the assembly is free from the automotive vehicle, it can be moved longitudinally of the elongated members and lowered in removing the assembly, and whereby a new assembly can be engaged by the lower end of the chain and raised to the proper elevation and then the chain hoist can be moved longitudinally of the chain hoist member to cause the assembly to be inserted in position and supported in that position until secured therein.

HARRY L. HARDIN.

REFERENCES CITED

The following references are of record in the file of this patent:

UNITED STATES PATENTS

| Number | Name | Date |
| --- | --- | --- |
| 508,866 | Butcher | Nov. 14, 1893 |
| 871,255 | Bragg | Nov. 19, 1907 |
| 1,002,063 | Jasper | Aug. 29, 1911 |
| 1,764,931 | Carlson | June 17, 1930 |
| 1,952,238 | Dice | Mar. 27, 1934 |
| 2,198,414 | Panchuk | Apr. 23, 1940 |